United States Patent [19]

Bönigk

[11] Patent Number: 5,396,152
[45] Date of Patent: Mar. 7, 1995

[54] ELECTRICAL CIRCUIT FOR THE PULSED OPERATION OF HIGH-PRESSURE GAS-DISCHARGE LAMPS

[75] Inventor: Michael Bönigk, Berlin, Germany

[73] Assignee: Patent-Treuhand-Gesellschaft fur Elektrische Gluhlampen m.b.H., Munich, Germany

[21] Appl. No.: 39,212

[22] PCT Filed: Dec. 4, 1991

[86] PCT No.: PCT/DE91/00940
§ 371 Date: Apr. 5, 1993
§ 102(e) Date: Apr. 5, 1993

[87] PCT Pub. No.: WO92/10920
PCT Pub. Date: Jun. 25, 1992

[30] Foreign Application Priority Data
Dec. 5, 1990 [DE] Germany .............. 40 39 186.8

[51] Int. Cl.6 ............................................. H05B 37/00
[52] U.S. Cl. ........................... 315/241 R; 315/240; 315/209 R; 315/227 R; 315/242; 315/244; 315/362
[58] Field of Search ............ 315/241 R, 240, 209 R, 315/227 R, 242, 244, 362, 287, 311

[56] References Cited

U.S. PATENT DOCUMENTS

| 2,462,371 | 2/1949 | Engle ..................... 315/284 |
| 4,442,380 | 4/1984 | Adachi ................. 315/241 R |
| 4,477,796 | 10/1984 | Kearsley ............. 315/241 R |
| 4,525,651 | 6/1985 | Ahlgren ................. 315/311 |
| 5,289,083 | 2/1994 | Quazi ..................... 315/284 |

FOREIGN PATENT DOCUMENTS

| 0334356 | 9/1989 | European Pat. Off. . |
| 0447010 | 9/1991 | European Pat. Off. . |
| 2657824 | 7/1977 | Germany . |
| 2729052 | 1/1978 | Germany . |
| 2825532 | 12/1978 | Germany . |
| 3122183 | 12/1982 | Germany . |
| 3540985 | 5/1987 | Germany . |
| 3636901 | 5/1988 | Germany . |
| 3641070 | 6/1988 | Germany . |

Primary Examiner—Robert J. Pascal
Assistant Examiner—Reginald A. Ratliff
Attorney, Agent, or Firm—Frishauf, Holtz, Goodman & Woodward

[57] ABSTRACT

The Lamp (La) is connected in series with first reactive impedances (C1, L1). To generate pulses, one or more second reactive impedances (C3, L3; C3-L2) are located as energy storage elements in series with one or more switch elements (S3, VTh1, VD1) to at least one of the first reactive impedances (C1, L1) and also in series with the high-pressure gas discharge lamp.

2 Claims, 2 Drawing Sheets

1

ELECTRICAL CIRCUIT FOR THE PULSED OPERATION OF HIGH-PRESSURE GAS-DISCHARGE LAMPS

FIELD OF THE INVENTION

The invention relates to an electrical circuit for the pulsed operation of high-pressure gas-discharge lamps.

BACKGROUND

It has already been known for a long time that the photometric parameters of gas discharge lamps can be improved substantially with the aid of a pulsed supply current. These methods have gained particular attention in sodium vapor high-pressure lamps, in which the color temperature can be raised from approximately 2000 to above 3000K by strobing. At the same time, an improvement in color reproduction is possible. German Patents DE-PS 26 57 824 and DE-PS 28 25 532 refer to these subjects.

When sodium vapor discharge lamps are operated with a plurality of metal vapors, bipolar impulses must be used, in order to prevent separation phenomena.

The nature of the strobe pulses, their shape, the pulse width, the duty factor, the rise and the height have a decisive influence on the attainable photometric parameters. In most versions, work is preferably done with relatively wide pulses (approximately 100 to 200 μs) and duty factors of approximately 0.2, with repetition rates below 500 Hz, as described in German Patent DE-PS 36 36 901.

At frequencies above 500 Hz, the discharge system has a tendency to develop resonant phenomena, which are expressed in the form of severe arc instabilities and losses in light yields (German Patent DE-PS 31 22 183). It is also known for the pulse geometry and pulse shaping to be formed in such a way, when electronic ballasts are used, that the pulses have a rapid transition from the cooling phase to the state of a predetermined pulse output, a prolonged operative time at that level, and a rapid return to the state of the cooling phase. For pulse shaping, a multiple-member delay line is proposed, comprising capacitive and inductive components. Experiments have shown that the optimal pulse width for sodium vapor discharge lamps is between 100 and 200 μs, so that if delay lines are used for pulse shaping, a suitable electronic ballast would be very expensive in terms of components and would be large in volume.

In principle it can be stated that generating relatively wide pulses of appropriate height makes major demands of ballast technology, because large quantities of energy must be stored and switched.

Electrical circuits for the pulsed operation of high-pressure gas-discharge lamps are known for instance from German Patent Disclosure DE-OS 36 41 070, German Patent DE-PS 35 40 985, and German Patent DE-PS 26 57 824.

A substantial disadvantage of these electrical circuits is the major technological effort and expense entailed in making them, and the great losses that must sometimes be expected in the current-limiting components. Moreover, a constant load can be supplied only by expanding the circuit, which is expensive.

THE INVENTION

It is an object of the invention is to create a electrical circuit for high-pressure gas-discharge lamps that enables pulsed operation at a sinusoidal holding load, at little technological effort or expense.

Briefly, according to the invention, for generating the strobe pulses, one or more reactive impedances are provided located as energy storing means in series with one or more switch elements, parallel to at least one of the reactive impedances that are connected in series to the high-pressure gas-discharge lamp.

The series circuit comprising a reactive impedance or impedances and a switch element or elements comprises either
- a capacitor in series with an electromechanical or electronic switch, or
- an inductance in series with an electromechanical or electronic switch, or
- an inductance and capacitor (serial oscillating circuit) in series with an electromechanical or electronic switch.

It can be stated that even conventional half-bridge circuits with a serial resonant circuit can be employed by supplying pulsed discharges, if success is achieved in suddenly increasing the energy furnished by the half-bridge circuit at the moment of pulsing. This is achieved with the electrical circuit proposed.

The exemplary circuit introduced here requires virtually no additional expense over that for conventional half-bridge circuits. All the necessary functions for the pulsed operation, such as ignition, holding load supply and strobing, are achieved. In this electrical circuit, lamp operation is effected with sinusoidal pulses.

Surprisingly, it was possible in experiments with sodium-vapor high-pressure lamps to find that the plasma is still capable of following very narrow spike pulses; in other words, an effective increase in the color temperature and color reproduction is also possible; the mean output is substantially dependent on the energy of the strobing pulses and their frequency, and any possible holding output is negligible.

By arranging the individual pulses in pulse groups, success in suppressing the resonant phenomena was achieved. The frequency of the individual pulses should be selected such that resonant frequency gaps are exploited, or else are higher than the resonant band of the discharge system.

The mean output supplied to the lamp is now substantially dependent on the width of the pulse groups and on the repetition rate of the pulse groups.

No loss in light yield compared with the strobed operation with wide rectangular pulses can be detected, and the photometric parameters, such as color temperature and color reproduction, attain identical values.

DRAWINGS

The invention will now be described in further detail in terms of an exemplary embodiment and the associated drawings.

DETAILED DESCRIPTION

Figure 1:
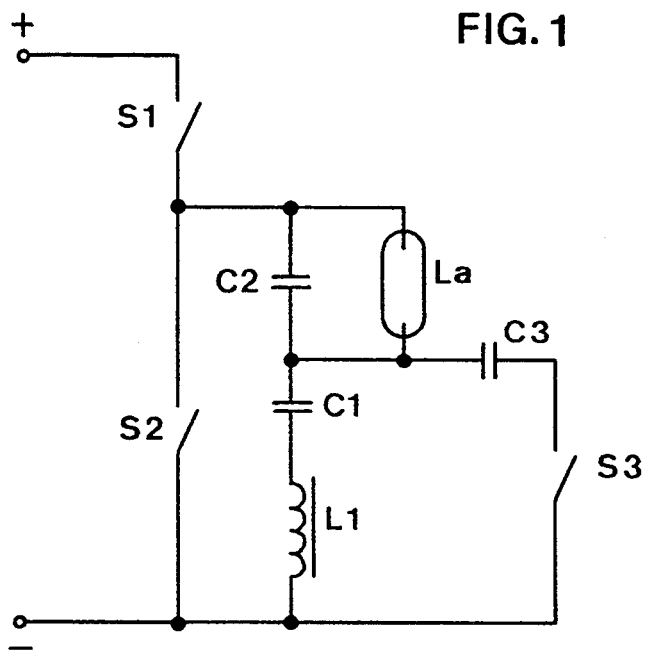
FIG. 1 shows a basic circuit diagram.

As shown in FIG. 1, two switches S1, S2 form a half-bridge and are triggered in phase opposition. If the oscillating circuit comprising the capacitors C1 and C2 and the inductance L1 are operated in the vicinity of its resonant frequency, then the high-pressure gas-discharge lamp La can be ignited with the aid of the voltage enhancement at the capacitor C2. After the ignition, the lamp acts as a load, and the voltage across the capacitor C2 breaks down to the arc operating voltage. The sinusoidal current that accordingly flows is utilized as a holding current.

The requisite rapid energy increase at the moment of strobing is attained by the parallel circuit of a capacitor C3 in series with a switch S3 to the two reactive impedances, the capacitor C1 and the inductance L1.

Figure 4:
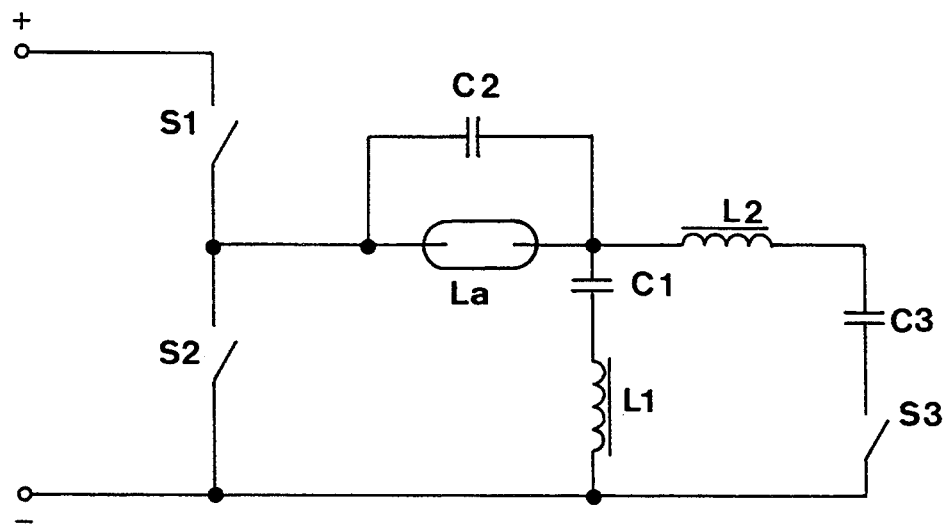
FIG. 4 shows an inductive resistor and capacitor in series with an electromechanical or electronic switch.

If a further inductance L2; see FIG. 4, is connected in series with the capacitor C3, then this oscillating circuit can be utilized for ignition as well.

The switch S3 is closed for pulsing the lamp. The capacitor C3 is charged via the switch S1 and the high-pressure gas-discharge lamp La, and it is discharged via the switch S2 and the high-pressure gas-discharge lamp La. Thus depending on the capacitance of the capacitor C3, very powerful pulses arise. No additional half-bridge circuit is required for that purpose.

Figure 2:
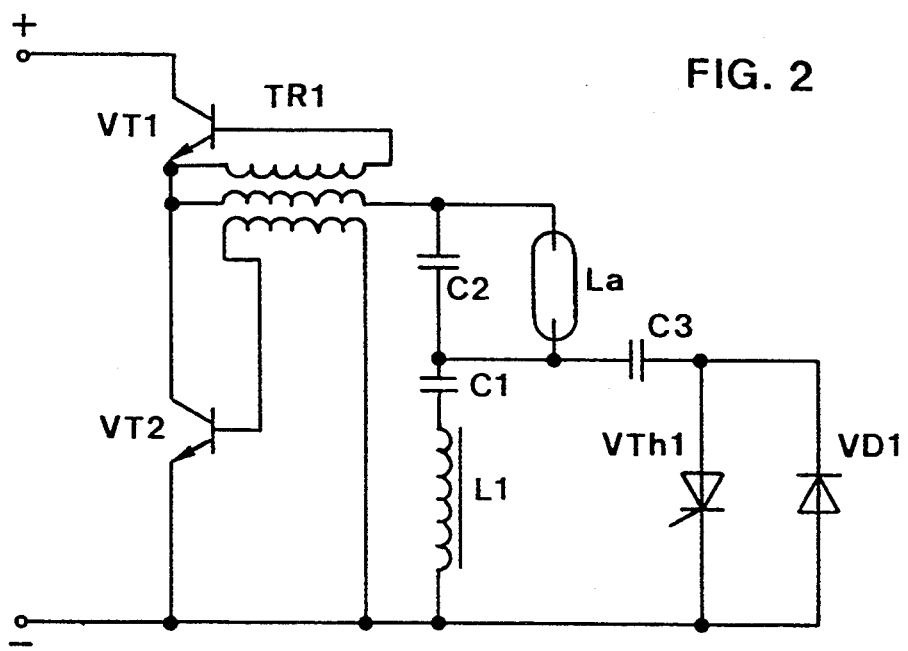
FIG. 2 shows an electrical circuit with electronic switches.

FIG. 2 shows an exemplary embodiment. The switches S1, S2 are formed by transistors VT1, VT2. Either bipolar or unipolar transistors may be used. The switch S3 is formed as an electronic switch with a thyristor VTh1 and a counter-parallel-connected diode VD1. Connecting the capacitor C3 in series with a further inductance L2, see FIG. 4, is possible.

The half-bridge may be operated in self-oscillating fashion or may be externally controlled. In the exemplary embodiment, a self-oscillating half-bridge with a current transformer TR1 operating in saturation mode has been selected. The triggering of the thyristor VTh1 is performed by a simple multivibrator circuit. Depending on the application, this circuit may operate synchronously or asynchronously to the holding current frequency.

The requisite direct voltage is obtained by rectification of the mains current.

If the high-pressure gas-discharge lamp is ignited via an external igniting device, the capacitor C2 may be omitted.

Figure 3:
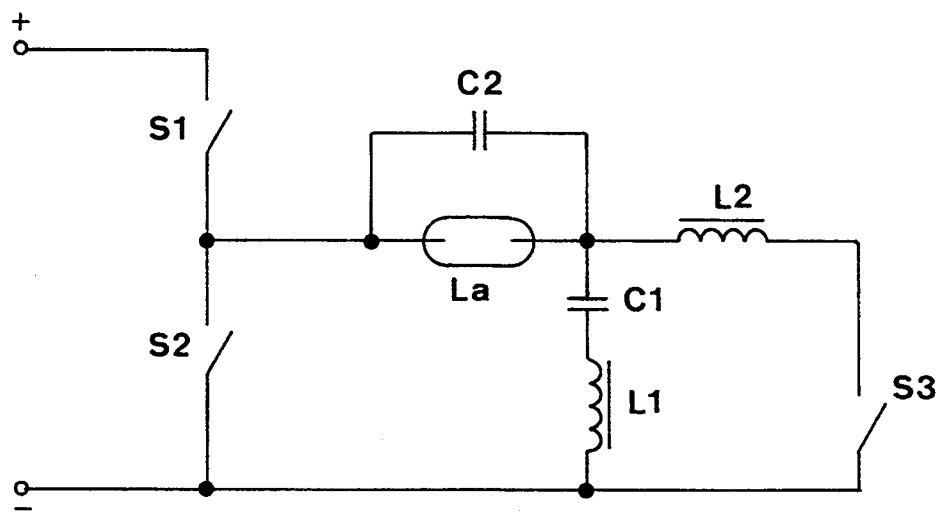
FIG. 3 shows an inductive resistor in series with an electromechanical or electronic switch.

The capacitor C3 can be replaced by an inductance L3, as illustrated in FIG. 3.

I claim:

1. An electrical circuit for pulsed operation of a high-pressure gas discharge lamp, in which the lamp (La) is in series with first reactive impedances, comprising
a capacitor (C2) connected in parallel to the high-pressure gas discharge lamp, and a half-bridge circuit (S1, S2; VT1, VT2) connected to supply electrical energy to the lamp,
wherein
to generate pulses for pulsed operation, one or more second reactive impedances (C3, L2, L3) are located as energy storing means in series with one or more switch elements (S3), said switch elements and second reactive impedances being connected in parallel to at least one of the first reactive impedances (C1, L1) and, further, connected in series with the high-pressure gas discharge lamp (La).

2. The circuit of claim 1, wherein the series circuit comprising one or more second reactive impedances (C3, L2, L3) and one or more switch elements (S3) comprises either
a capacitor (C3) in series with an electromechanical or electronic switch (S3; VTh1, VD1), or
an inductance (L3) in series with an electromechanical or electronic switch, or
a capacitor (C3) and an inductance (L2), forming a series oscillating circuit, connected in series with an electromechanical or electronic switch,
wherein the respective electromechanical or electronic switch forms said one or more switch element (S3, VTh1, VD1).

* * * * *